(12) United States Patent  
Jiang

(10) Patent No.: US 8,213,339 B2  
(45) Date of Patent: Jul. 3, 2012

(54) RSTP PROCESSING SYSTEM

(75) Inventor: Wei Jiang, Tokyo (JP)

(73) Assignee: Yamatake Corporation, Tokyo (JP)

( * ) Notice: Subject to any disclaimer, the term of this patent is extended or adjusted under 35 U.S.C. 154(b) by 296 days.

(21) Appl. No.: 12/596,312

(22) PCT Filed: Apr. 22, 2008

(86) PCT No.: PCT/JP2008/057766  
§ 371 (c)(1),  
(2), (4) Date: Oct. 16, 2009

(87) PCT Pub. No.: WO2008/133250  
PCT Pub. Date: Nov. 6, 2008

(65) Prior Publication Data  
US 2010/0128732 A1    May 27, 2010

(30) Foreign Application Priority Data

Apr. 25, 2007 (JP) .................................. 2007-115389

(51) Int. Cl.  
*H04L 12/28* (2006.01)

(52) U.S. Cl. ....................................................... 370/256

(58) Field of Classification Search ........................ None  
See application file for complete search history.

(56) References Cited

U.S. PATENT DOCUMENTS

| 6,584,109 B1* | 6/2003 | Feuerstraeter et al. ....... 370/401 |
| 2004/0179524 A1* | 9/2004 | Sasagawa et al. ............. 370/389 |
| 2006/0007869 A1* | 1/2006 | Hirota et al. .................. 370/244 |

FOREIGN PATENT DOCUMENTS

| JP | 2004-282409 A | 10/2004 |
| JP | 2005-109846 A | 4/2005 |
| JP | 2006-174422 A | 6/2006 |

* cited by examiner

*Primary Examiner* — Marcus R Smith  
(74) *Attorney, Agent, or Firm* — McDermott Will & Emery LLP; Louis J. DelJuidice; Hiroyuki Yasuda

(57) ABSTRACT

The invention can achieve a recovery time that satisfies the demands of real-time transmission processing by performing, in an extremely short time period, an RSTP process in a network, which is configured in a ring topology and wherein a plurality of IEEE 802.3 compliant nodes is connected via prescribed transmission lines, using hardware to execute processes related to the physical layer and the data link layer of the OSI reference model—without software processing. The RSTP processing unit of each node: receives BPDU data, which is received from the network by one of two PHY units and stored in a BPDU send/receive buffer of a corresponding MAC unit that is connected to that PHY unit, via a BPDU data bus that is connected to that MAC unit; decodes the received BPDU data; performs a prescribed process; transfers the BPDU data, via the BPDU data bus that is connected to the other MAC unit, to the other BPDU send/receive buffer; and transmits that BPDU data from the PHY unit connected to the other MAC unit to the network.

3 Claims, 15 Drawing Sheets

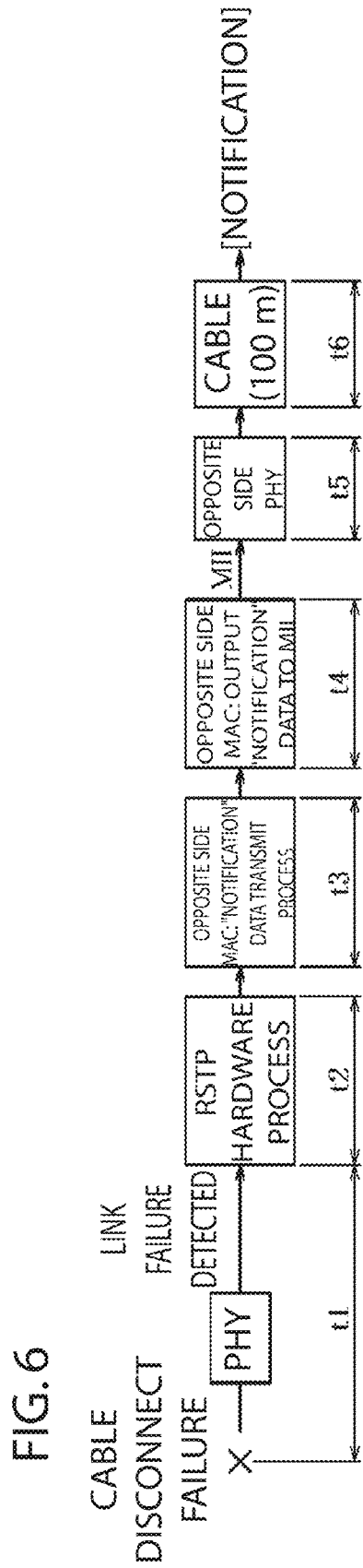

FIG. 7

| Time | Definition | Time Value | Conditions |
|---|---|---|---|
| t1 | Time from when a failure occurs until a link failure is detected by the PHY. (PHY dependent.) | <20 μs (actual measurement) | • 100BASE-TX<br>• PHY operating clock frequency: 25 MHz |
| t2 | RSTP hardware processing time. | 0.14 μs (7 clock cycles) | • Operating clock frequency: 50 MHz |
| t3 | Opposite side MAC "notification" data transmit processing time. | 0.2 μs (5 clock cycles) | • Operating clock frequency: 25 MHz |
| t4 | Time needed by the opposite side MAC to output "notification" data to the MII I/F. | 5.76 μs | • 100BASE-TX<br>• "Notification" frame length: 72 bytes |
| t5 | PHY transfer delay time. | 70 ns (7 BT) | • 100BASE-TX<br>• PHY operating clock frequency: 25 MHz |
| t6 | Cable propagation time. | 538 ns | • TIA/EIA-568-A-5 compliant category 5 cable<br>• Cable length: 100 m |

| Time | Definition | Time Value | Conditions |
|---|---|---|---|
| t7, t13, t17 | PHY transfer delay times. | 70 ns (7 BT) | • 100BASE-TX<br>• PHY operating clock frequency: 25 MHz |
| t8 | MAC "notification" receive time (i.e., time needed to input data from the MII). | 5.76 μs | • 100BASE-TX<br>• "Notification" frame length: 72 bytes |
| t9 | MAC "notification" data receive processing time. | 0.28 μs (7 clock cycles) | • Operating clock frequency: 25 MHz |
| t10 | RSTP processing time. | 0.52 μs (26 clock cycles) | • Operating clock frequency: 50 MHz |
| t11 | MAC "ACK" data transmit processing time. | 0.2 μs (5 clock cycles) | • Operating clock frequency: 25 MHz |
| t12 | Time needed by the MAC to output "ACK" data to the MII. | 5.76 μs | • 100BASE-TX<br>• "ACK" frame length: 72 bytes |
| t14, t18 | Cable propagation times. | 538 ns | • TIA/EIA-568-A-5 compliant category 5 cable<br>• Cable length: 100 m |
| t15 | Other MAC "notification" data transmit processing time. | 0.2 μs (5 clock cycles) | • Operating clock frequency: 25 MHz |
| t16 | Time needed by the other MAC to output "notification" data to the MII I/F. | 5.76 μs | • 100BASE-TX<br>• "Notification" frame length: 72 bytes |

FIG. 9

| Time | Definition | Time Value | Conditions |
|---|---|---|---|
| t9, t25, t29 | PHY transfer delay times. | 70 ns (7 BT) | • 100BASE-TX<br>• PHY operating clock frequency: 25 MHz |
| t20 | Time needed by the MAC to input "notification" data from the MII. | 5.76 μs | • 100BASE-TX<br>• "Notification" frame length: 72 bytes |
| t21 | MAC "notification" data receive processing time. | 0.28 μs (7 clock cycles) | • Operating clock frequency: 25 MHz |
| t22 | RSTP processing time. | 0.32 μs (16 clock cycles) | • Operating clock frequency: 50 MHz |
| t23 | MAC "Re: notification" data transmit processing time. | 0.2 μs (5 clock cycles) | • Operating clock frequency: 25 MHz |
| t24 | Time needed by the MAC to output "Re: notification" data to the MII. | 5.76 μs | • 100BASE-TX<br>• "ACK" frame length: 72 bytes |
| t26, t30 | Cable propagation times. | 538 ns | • TIA/EIA-568-A-5 compliant category 5 cable<br>• Cable length: 100 m |
| t27 | Other MAC "Re: notification" data transmit processing time. | 0.2 μs (5 clock cycles) | • Operating clock frequency: 25 MHz |
| t28 | Time needed by the other MAC to output "Re: notification" data to the MII. | 5.76 μs | • 100BASE-TX<br>• "Notification" frame length: 72 bytes |

| Time | Definition | Time Value | Conditions |
|---|---|---|---|
| t31, t37, t41 | PHY transfer delay times. | 70 ns (7 BT) | • 100BASE-TX<br>• PHY operating clock frequency: 25 MHz |
| t32 | Time needed by the MAC to input "Re: notification" data from the MII. | 5.76 μs | • 100BASE-TX<br>• "Notification" frame length: 72 bytes |
| t33 | MAC "Re: notification" data receive processing time. | 0.28 μs (7 clock cycles) | • Operating clock frequency: 25 MHz |
| t34 | RSTP processing time. | 0.4 μs (20 clock cycles) | • Operating clock frequency: 50 MHz |
| t35 | MAC "ACK" data transmit processing time. | 0.2 μs (5 clock cycles) | • Operating clock frequency: 25 MHz |
| t36 | Time needed by the MAC to output "ACK" data to the MII. | 5.76 μs | • 100BASE-TX<br>• "ACK" frame length: 72 bytes |
| t38, t42 | Cable propagation times. | 538 ns | • TIA/EIA-568-A-5 compliant category 5 cable<br>• Cable length: 100 m |
| t39 | Other MAC "Re: notification" data transmit processing time. | 0.2 μs (5 clock cycles) | • Operating clock frequency: 25 MHz |
| t40 | Time needed by the other MAC to output "Re: notification" data to the MII. | 5.76 μs | • 100BASE-TX<br>• "Notification" frame length: 72 bytes |

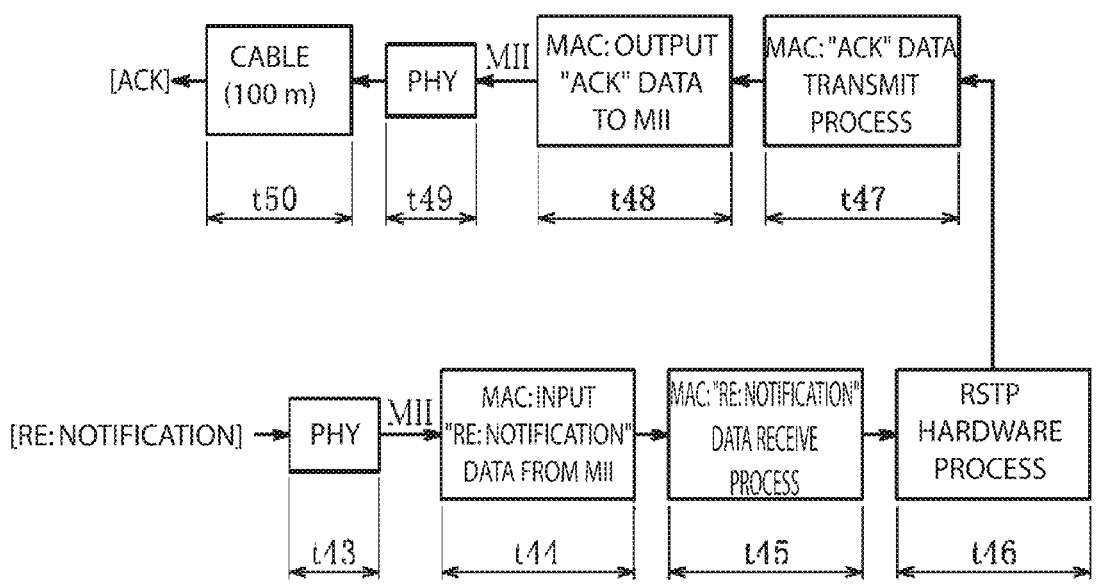

FIG. 14

| Time | Definition | Time Value | Conditions |
|---|---|---|---|
| t43, t49 | PHY transfer delay times. | 70 ns (7 BT) | • 100BASE-TX<br>• PHY operating clock frequency: 25 MHz |
| t44 | Time needed by the MAC to input "Re: notification" data from the MII. | 5.76 μs | • 100BASE-TX<br>• "Notification" frame length: 72 bytes |
| t45 | MAC "Re: notification" data receive processing time. | 0.28 μs (7 clock cycles) | • Operating clock frequency: 25 MHz |
| t46 | RSTP processing time. | 0.52 μs (26 clock cycles) | • Operating clock frequency: 50 MHz |
| t47 | MAC "ACK" data transmit processing time. | 0.2 μs (5 clock cycles) | • Operating clock frequency: 25 MHz |
| t48 | Time needed by the MAC to output "ACK" data to the MII. | 5.76 μs | • 100BASE-TX<br>• "ACK" frame length: 72 bytes |
| t50 | Cable propagation times. | 538 ns | • TIA/EIA-568-A-5 compliant category 5 cable<br>• Cable length: 100 m |

FIG. 15

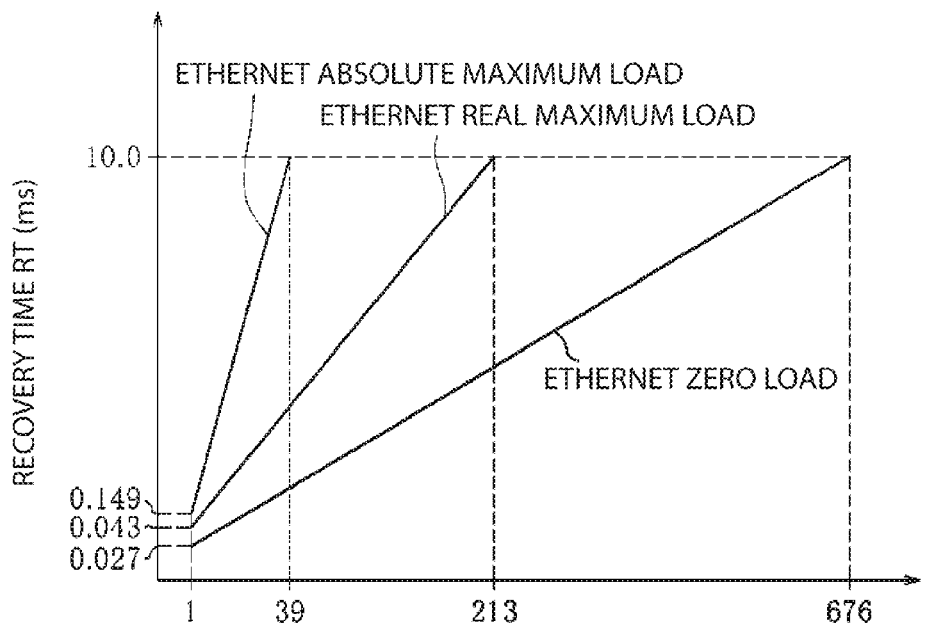

FIG. 16

NUMBER OF NODES

RSTP PROCESSING SYSTEM

CROSS REFERENCE TO RELATED APPLICATION

This is the U.S. national phase application under 35 U.S.C. §371 of International Patent Application No. PCT/JP2008/057766, filed Apr. 22, 2008, which claims the benefit of Japanese Application No. 2007-115389, filed Apr. 25, 2007. The International Application was published on Nov. 6, 2008 as International Publication No. WO/2008/133250 under PCT Article 21(2). The contents of these applications are incorporated herein in their entirety.

FIELD OF THE INVENTION

The present invention relates to an RSTP processing system in a network that has a ring topology and wherein a plurality of IEEE 802.3 compliant nodes are connected via prescribed transmission lines, and more particularly relates to an RSTP processing system that is capable of recovering extremely rapidly from a network failure.

RELATED ART

Switching hubs, which switch packets in local area networks (LANs) based on, for example, the IEEE 802.3 compliant Ethernet® specification, have been used widely in the conventional art. This type of switching hub is equipped with a function that prevents the occurrence of loops by sending and receiving bridge protocol data units (BPDUs) based on the spanning tree protocol stipulated by IEEE 802.1D/w.

Nevertheless, if the central processing unit (CPU), which controls the switching hub, stops processing while the switching hub continues switching, then the spanning tree protocol will not function correctly and a loop will unfortunately be formed in the network. To prevent such a problem, a packet switching apparatus and a method of stabilizing a spanning tree topology are known (e.g., refer to Japanese Laid-Open Patent Application No. 2005-109846).

In this apparatus and method, if hardware is used to implement the spanning tree protocol in the apparatus that switches the packets, then a circuit that monitors the transmission of BPDUs to the circuit that performs the packet switching is incorporated, and, should a BPDU not be transmitted within the time stipulated by the spanning tree protocol, stopping the packet switching will prevent the occurrence of a loop in the network topology and thereby stabilize the network.

Incidentally, IEEE 802.3 compliant networks are widely used in offices and homes, and their application to factory systems and building systems is also being tested. Furthermore, from the standpoint of convenience, networks adapted to offices employ a star topology as the wiring system. Moreover, because, generally speaking, the wiring lengths of the transmission lines in a network mode installed in a factory system or a building system inevitably become long, adopting a bridge wiring system that spans the plurality of control devices (hereinbelow, called nodes) is preferable. Specifically, as shown in FIG. 17, nodes N1', N2', . . . , Nn' are equipped with switching hubs S1', S2', . . . , Sn', respectively; furthermore, each of the switching hubs S1, S2, . . . , Sn has two ports, each of which is connected to a different node via a transmission line 1, which thereby constitutes a ring topology. Furthermore, the rapid spanning tree protocol (RSTP) according to IEEE 802.1w is installed in each of the switching hubs S1', S2', . . . , Sn'.

Originally, RSTP was designed to prevent packets from looping endlessly within a network. By using the RSTP function shown in FIG. 17, a state is maintained wherein one location in the network is logically disconnected (i.e., blocked) even if the network is configured as a ring, and therefore packets do not loop endlessly within the network.

In a network so configured, a network failure, such as the disconnection of one of the transmission lines 1 or the loss of power to a node, is detected by implementing a health check that confirms health of the network by transmitting a predetermined packet (specifically, a BPDU) to the network every time a prescribed time elapses. Furthermore, if a BPDU is not received within a fixed time, then each node is checked to determine whether a failure has occurred in it. Thereupon, the switching hubs S1, S2, . . . , Sn cancel the blocking of the network and form a new communication route. In so doing, a network failure is avoided and the normal communications function can be maintained (i.e., recovered).

In greater detail, as shown in FIG. 18, each of the switching hubs S1', S2', . . . , Sn' comprises: two PHY units 3A, 3B, which are connected to the transmission lines 1 via two ports 2A, 2B and perform processing related to the physical layer of the OSI reference model; two MAC units 4A, 4B, which are connected to the PHY units 3A, 3B and perform processing related to a lower sublayer of the data link layer in OSI reference model; and a buffer/transfer circuit unit 6, which both exchanges data with the MAC units 4A, 4B and a CPU 5 and transfers data between the MAC unit 4A and the MAC unit 4B.

The CPU 5 executes processes of layers above the data link layer processed by the switching hubs S1', S2', . . . , Sn' (i.e., the application layer and the network layer). The CPU 5 comprises an RSTP algorithm 7, which executes the RSTP process discussed above using software. In addition, the PHY units 3A, 3B are respectively provided with LINK lines 8A, 8B, which report detected network failures to the buffer/transfer circuit unit 6.

In a network so configured, BPDUs are transmitted, and the network health thereby verified (i.e., a health check performed), at prescribed intervals (generally, every two seconds). In this case, because the RSTP algorithm is a process that is implemented by software, an interval of approximately several seconds (i.e., the recovery time) transpires from the time of a failure until recovery is complete.

Incidentally, the network transmission period required to handle real-time transmission such as in a factory system or a building system is extremely short, and is preferably, for example, approximately 10 ms. Accordingly, demand exists for complete recovery within the range of the transmission period.

Nevertheless, in a network configured as discussed above, because recovery requires approximately several seconds, it consequently cannot be applied to a network that requires real-time transmission processing such as in a factory system or a building system, which is a problem.

Incidentally, to shorten the recovery time, it is also possible to detect a failure in the physical layer level via the LINK lines 8A, 8B; in such a case, even though it is possible to shorten the recovery time to 50 ms, it still cannot be applied to the factory system or the building system discussed above, which have even shorter transmission periods, and that is a problem.

SUMMARY OF THE INVENTION

The present invention was conceived taking into consideration the circumstances of the conventional art, and it is an object of the present invention to provide an RSTP processing system that can achieve a recovery time that satisfies the demands of real-time transmission processing by performing, in an extremely short time period, an RSTP process in a network configured in a ring topology and wherein a plurality of IEEE 802.3 compliant nodes is connected via prescribed transmission lines.

To achieve the abovementioned object, an RSTP processing system of the present invention is an RSTP processing system in a network that has a ring topology wherein multiple IEEE 802.3 compliant nodes are connected via prescribed transmission lines, wherein
each of the nodes comprises:
two PHY units, each of which is connected to one of the transmission lines and executes processing according to the physical layer of the OSI reference model;
two MAC units, each of which is connected to one of the PHY units and executes processing according to a lower sublayer of the data link layer of the OSI reference model;
an RSTP processing unit, which is connected to the MAC units and processes a rapid spanning tree protocol;
two BPDU send/receive buffers, each of which is provided to one of the MAC units and sends and receives BPDU data in the rapid spanning tree protocol; and
two BPDU data buses, which transfer the BPDU data between the BPDU send/receive buffers and the RSTP processing unit.

The RSTP processing unit of the RSTP processing system of the present invention: receives BPDU data, which is received from the network by one of the PHY units and stored in the BPDU send/receive buffer of the MAC unit that is connected to that PHY unit, via the BPDU data bus that is connected to that MAC unit; decodes the received BPDU data; performs a prescribed process; transfers prescribed BPDU data, via the BPDU data bus that is connected to the other MAC unit, to the other BPDU send/receive buffer; and transmits that BPDU data from the PHY unit connected to the other MAC unit to the network.

Namely, BPDU data stored in the BPDU send/receive buffer of one of the MAC units is received via the corresponding BPDU data bus, the BPDU data is decoded, the prescribed process is performed, BPDU data is transmitted from the other MAC unit and the other PHY unit via the BPDU data bus connected to the other MAC unit, and this sequence of processes is executed via the hardware of the RSTP processing unit and not via software.

In the RSTP processing system according to the present invention, the RSTP processing unit, which processes the RSTP, is incorporated as hardware in the data link layer, the RSTP processing unit and the BPDU send/receiver buffers of the MAC units are respectively connected by the BPDU data buses, and the RSTP process is executed in the hardware; therefore, BPDUs can be processed at extremely high speeds without the intervention of software processing.

Furthermore, if a configuration is adopted wherein the PHY unit has a link signal line that is used to notify the RSTP processing unit of a failure in the physical layer level and the RSTP processing unit, when it is notified via the link signal line of one of the PHY units of a failure in the physical layer level, transmits to the network via the other PHY unit notification BPDU data from the BPDU send/receive buffer that has the MAC unit connected to the other PHY unit, then the RSTP processing unit is notified, via the link signal, of failures in the physical layer level detected by the PHY unit, and the RSTP processing unit that receives the failure notification via the link signal transmits BPDU data to the network from the BPDU send/receive buffer of the other MAC unit connected to the other PHY unit; therefore, BPDU data can be transferred with extremely small transmission delay times.

Furthermore, if a configuration is adopted wherein the RSTP processing unit comprises two port control modules, which control the BPDU send/receive buffers of the two MAC units, and a priority order control module, which determines the priority level of the local node in the network, and if the BPDU send/receive operations of the two MAC units are performed as a parallel process, then it is possible to switch at high speed the order of priority of nodes (i.e., to switch the root and the designated) during a recovery; furthermore, the transmission of BPDU data by the two MAC units to neighboring nodes in a ring network can be processed in parallel via hardware; therefore, it is possible to implement a network recovery system that can recover from a failure in a short time.

Furthermore, if a configuration is adopted wherein, in addition to the port control module and the priority order control module, each of the MAC units comprises: an upper layer data bus, which transfers send/receive data to and from a CPU, which controls a protocol of an upper layer of the OSI reference model; a switch unit, which switches the connection of the PHY unit to either the upper layer data bus or the BPDU send/receive buffer; and a BPDU send/receive processing module, that, under the control of the RSTP processing unit, switches the connection destination of the switch unit; and if when either the receive data transferred from one of the PHY units to the corresponding MAC unit or the transmit data transferred from one of the MAC units to the corresponding PHY unit is the BPDU data, the corresponding port control module issues an instruction to the corresponding BPDU send/receive processing module to switch the corresponding switch unit to the corresponding BPDU send/receive buffer side; and when the receive data or the transmit data is not the BPDU data, the corresponding port control module issues an instruction to switch the corresponding switch unit to the corresponding upper layer data bus side, then, when the receive data transferred from one of the PHY units to the corresponding MAC unit is BPDU data, the RSTP processing unit issues an instruction to switch the corresponding switch unit to the corresponding BPDU send/receive buffer side; furthermore, when the receive data is not BPDU data, the RSTP processing unit issues an instruction to the corresponding BPDU send/receive processing module to switch the corresponding switch unit to the corresponding upper layer data bus side; in addition, similarly, if the transmit data is not BPDU data, then the RSTP processing unit issues an instruction to the corresponding BPDU send/receive processing module to switch the corresponding switch unit to the corresponding upper layer data bus side; thereby, enormously practical effects, wherein, for example, it is possible to achieve both the recovery of the network from a failure and the maintenance of communication with the upper layer, are obtained.

According to the present invention, the RSTP processing system of any of the configurations discussed above can perform at high speed an RSTP process in the data link layer via hardware and thereby can achieve an RSTP recovery time of less than 10 ms.

BRIEF DESCRIPTION OF THE DRAWINGS

FIG. 6 shows the times from when a node failure is detected until the transmission of a notification to the adjacent node is complete.

FIG. 7 lists the definition, time value, and conditions for each of the times shown in FIG. 6.

FIG. 9 lists the definition, time value, and conditions for each of the times shown in FIG. 8.

FIG. 11 lists the definition, time value, and conditions for each of the times shown in FIG. 10.

FIG. 13 lists the definition, time value, and conditions for each of the times shown in FIG. 12.

FIG. 14 shows the times from when a node that has detected a failure receives a reply to a notification until the transmission of an ACK is complete.

FIG. 15 lists the definition, the time value, and the conditions for each of the times shown in FIG. 14.

FIG. 16 is a graph that shows the relationship between the number of nodes and recovery time.

DETAILED DESCRIPTION OF THE PRESENT INVENTION

Figure 17:
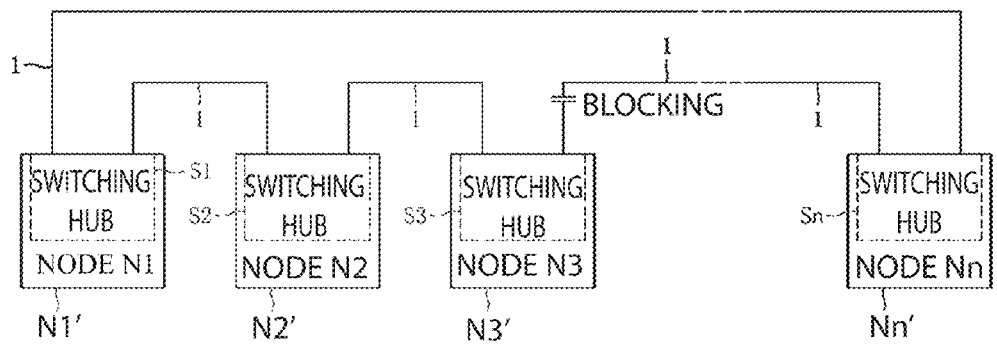
FIG. 17 is a block diagram that shows a schematic configuration of the network, which is configured in a ring topology, wherein a plurality of nodes is connected via transmission lines.

An RSTP processing system of the present invention will now be explained, referencing the drawings. Furthermore, FIG. 1 through FIG. 16 are for explaining the RSTP processing system according to an embodiment of the present invention, but the present invention is not limited to these drawings. In addition, to explain the prior art, portions in these drawings that are assigned symbols identical to the constituent elements shown in FIG. 17 and FIG. 18 have substantially the same configuration and function, and detailed explanations thereof are therefore omitted.

Figure 1:
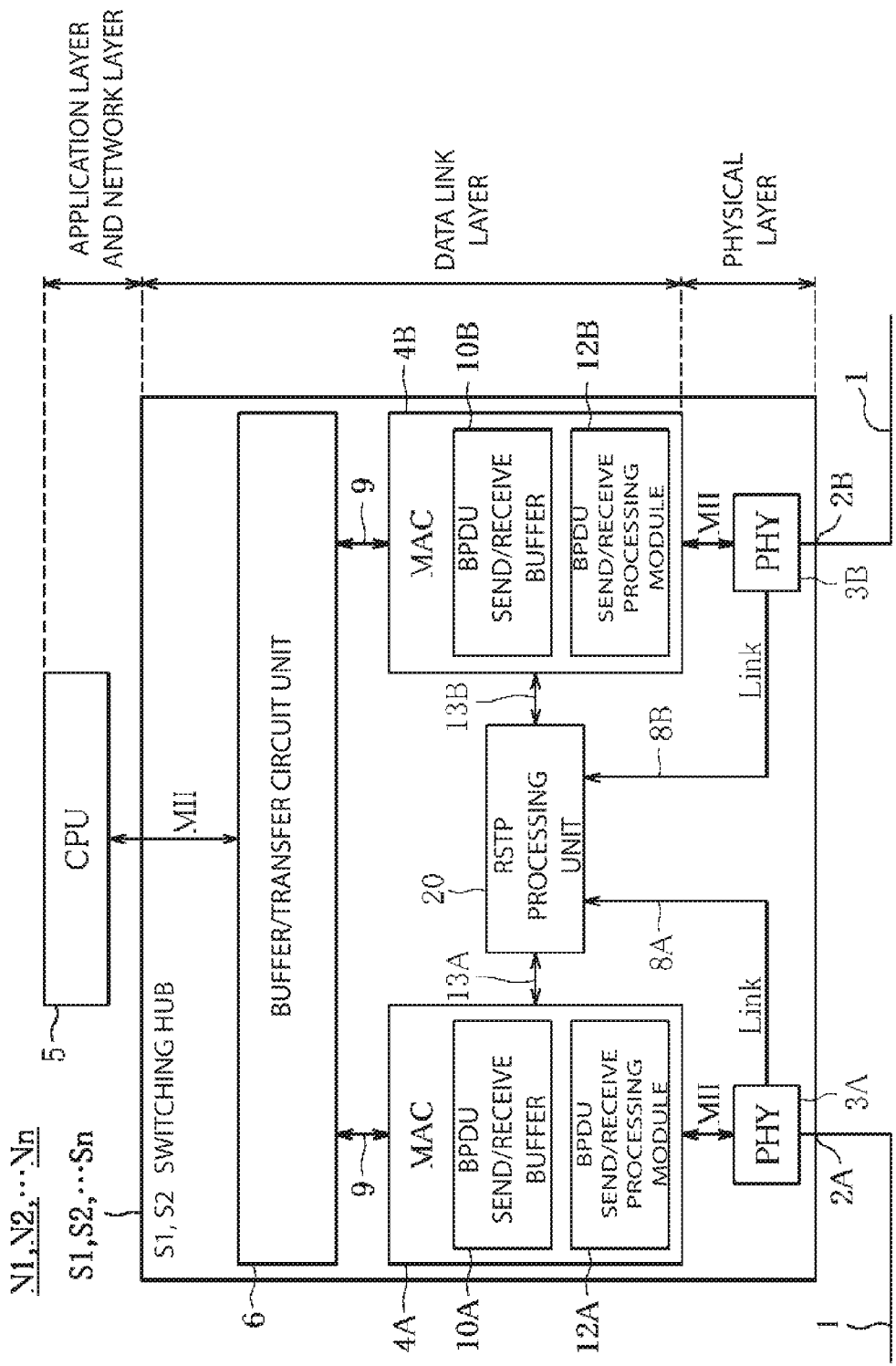
FIG. 1 is a block diagram that shows the principal components of a node and a switching hub according to an embodiment of the present invention.
Figure 2:
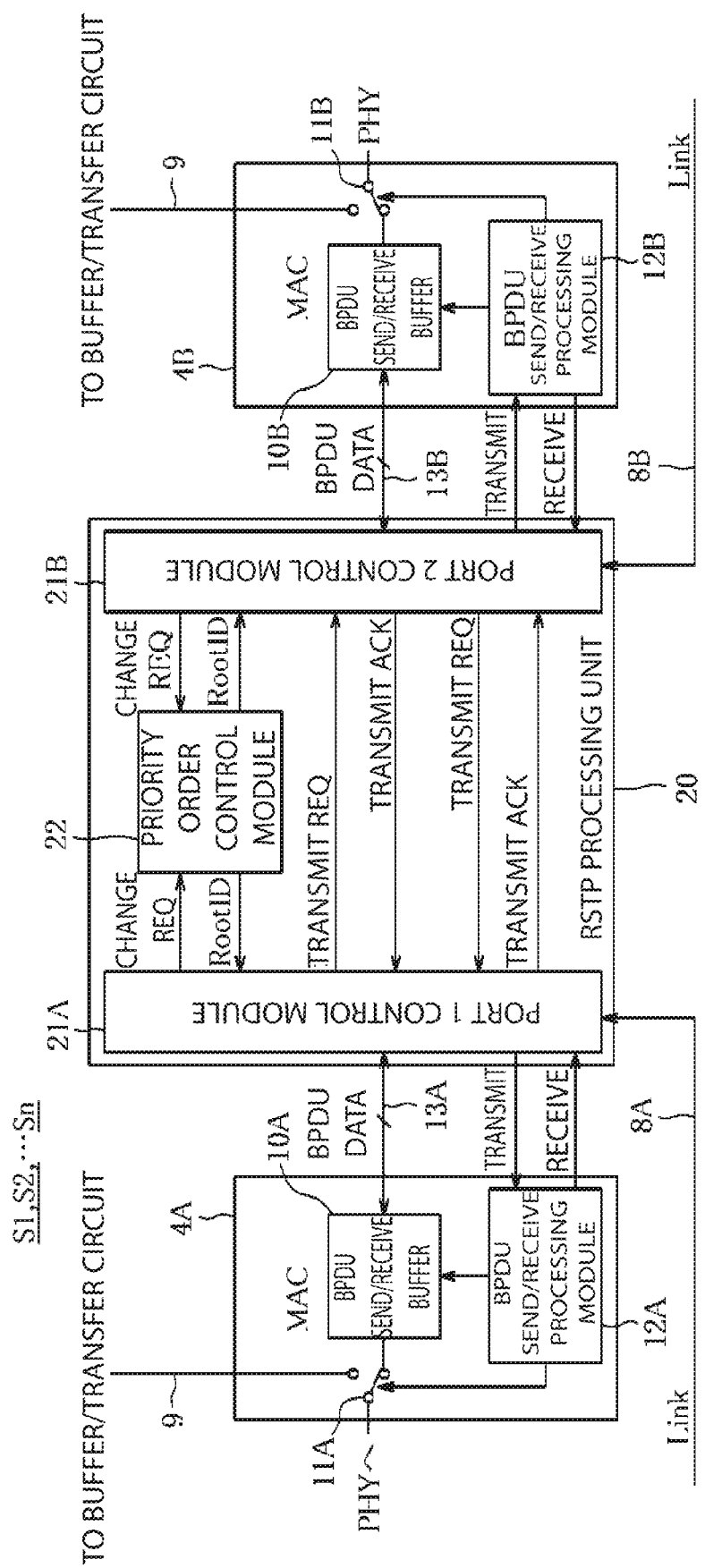
FIG. 2 is a block diagram that shows the detailed configuration of the switching hub shown in FIG. 1.

FIG. 1 and FIG. 2 each show the configuration of switching hubs S1, S2, ..., Sn, which are respectively installed in nodes N1, N2, ..., Nn. Each of the switching hubs according to the present invention comprises: two PHY units 3A, 3B, which are connected to transmission lines 1 and execute processing according to the physical layer of the OSI reference model; and two MAC units 4A, 4B, which are connected to the PHY units 3A, 3B and perform processing according to a lower sublayer of the data link layer of the OSI reference model.

Figure 18:
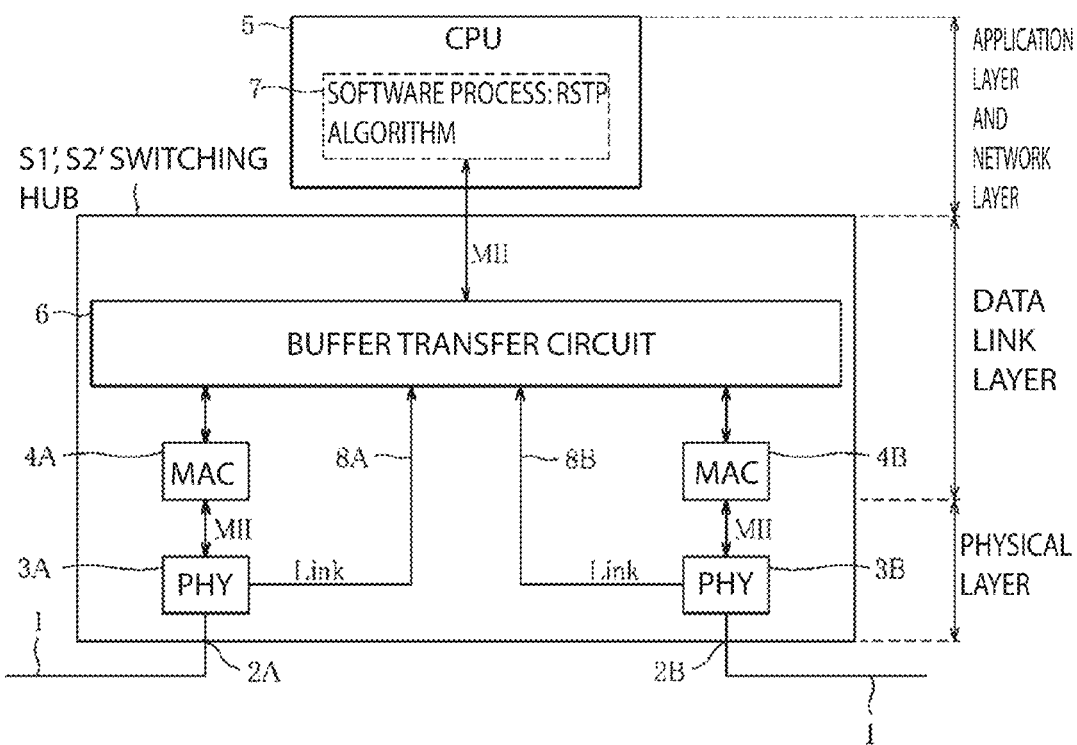
FIG. 18 is a block diagram that shows the principal components of a conventional node and switching hub.

Although discussed in detail below, the switching hubs S1, S2, ..., Sn shown in these drawings differ from the conventional switching hubs shown in FIG. 18 in that BPDU send/receiver buffers 10A, 10B, each of which send and receive BPDU data in the rapid spanning tree protocol, are respectively provided to the two MAC units 4A, 4B separately from a buffer/transfer circuit unit 6. Furthermore, the MAC units 4A, 4B are respectively provided with switch units 11A, 11B, which switch the data connections between the PHY units 3A, 3B and either the BPDU send/receiver buffers 10A, 10B or the buffer/transfer circuit unit 6, and BPDU send/receive processing modules 12A, 12B, which respectively control the switching of the switch units 11A, 11B. Furthermore, each of the switching hubs is provided with an RSTP processing unit 20, which executes RSTP processing via hardware without the use of software, and BPDU data buses 13A, 13B, which transfer data between the RSTP processing unit 20 and the BPDU send/receiver buffers 10A, 10B.

The RSTP processing unit 20 comprises port control modules 21A, 21B, which respectively send data to and receive data from the BPDU send/receiver buffers 10A, 10B via the BPDU data buses 13A, 13B and also respectively issue control instructions to the BPDU send/receive processing modules 12A, 12B.

The two port control modules 21A, 21B send requests-to-send (i.e., transmit REQs) and confirmation responses (i.e., transmit ACKs) thereto back and forth between one another regarding the MAC units 4A, 4B connected thereto.

In addition, the BPDU data buses 13A, 13B each have a data width of 64 bytes, which matches the size of the BPDU data, and therefore 64 bytes of BPDU data can be transferred between the BPDU data buses 13A, 13B in a single shot (i.e., in 1 clock cycle). Namely, the transference (i.e., reading/writing) of BPDU data between the port control modules 21A, 21B and the BPDU send/receiver buffers 10A, 10B respectively is completed in 1 clock cycle.

In addition, the two port control modules 21A, 21B are connected to a priority order control module 22, which controls the priority level of the local node reported from the MAC units 4A, 4B controlled by the port control modules 21A, 21B, respectively. The priority order control module 22 prescribes the order of priority, namely, the root and the designated, in the RSTP algorithm and both receives priority order change requests (i.e., change REQs) from the port control modules 21A, 21B and returns ID information (i.e., a root ID) in response to those requests.

The following text discusses in greater detail the processing protocol in the RSTP processing system of the present invention configured as described above and the effect of shortening recovery time.

Figure 3:
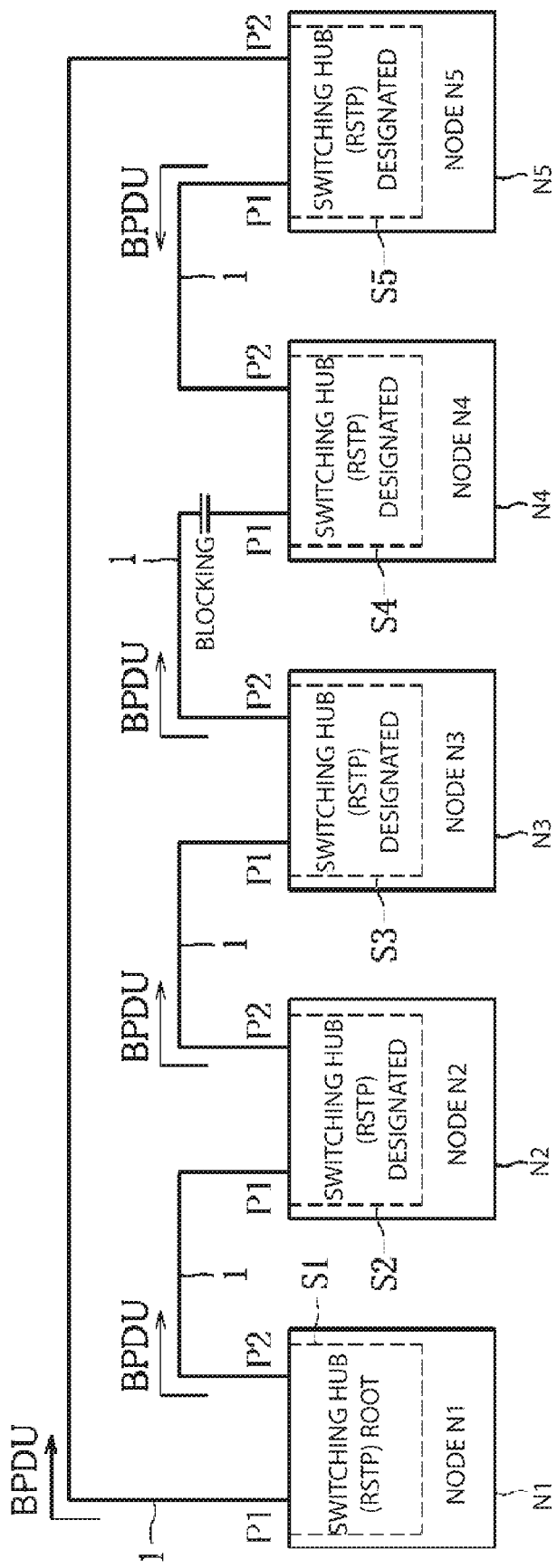
FIG. 3 is a view that shows the flow of BPDU data in a network wherein a plurality of nodes are configured in a ring topology via transmission lines.

First, the blocking and recovery of a transmission path by RSTP processing will be explained. Furthermore, because the RSTP process, which is compliant with IEEE 802.1w, is well known, only the transmission path states resulting from the RSTP process will be explained. To study the effect of shortening recovery time, a network configured in a ring topology is taken up as an example; therein, five nodes N1-N5 are respectively provided with switching hubs S1-S5, as shown in FIG. 3 (in FIG. 3, and likewise below, the switching hub is designated as SW. HUB. and the two ports of each of the switching hubs S1-S5 are connected, in sequence, to an adjacent node via one of the transmission lines 1. Here, the smaller the node number, the higher the priority level. Namely, the node N1 has the highest priority level and serves as the master (i.e., the root), and the other nodes N2-N5 have priority levels lower than that of the node N1 and therefore serve as the slaves (i.e., the designateds). In addition, the two ports of each of the switching hubs S1-S5 are referred to as port P1 and port P2. Here, in each of the five switching hubs S1-S5 shown in FIG. 3, the left side port is the port P1 and the right side port is the port P2.

As such, it is automatically decided that the root switching hub (hereinbelow, called the root), which serves as the master, is the node N1, which has the highest priority level. Furthermore, when the network is operating normally, the node N1, which is the root, transmits from its two ports (P1 and P2) to the other nodes N5, N2 a BPDU for a health check every time a prescribed interval elapses (generally, every two seconds). The node N2 and the node N5, each of which receive a BPDU, transfer their received BPDUs to their neighboring nodes. Namely, the node N2 transfers its BPDU from its port P2 to the port P1 of the node N3, and the node N5 transfers its BPDU from its port P1 to the port P2 of the node N4.

Continuing, the node N3 likewise transfers its BPDU from its port P2 to the port P1 of the node N4, and the node N4 transfers its BPDU from its port P1 to the port P2 of the node N3. At this time, the node N3 and the node N4 logically block communication between the port P2 of the node N3 and the port P1 of the node N4. Thus, by blocking internode communication, packets are prevented from looping within the network.

Figure 4:
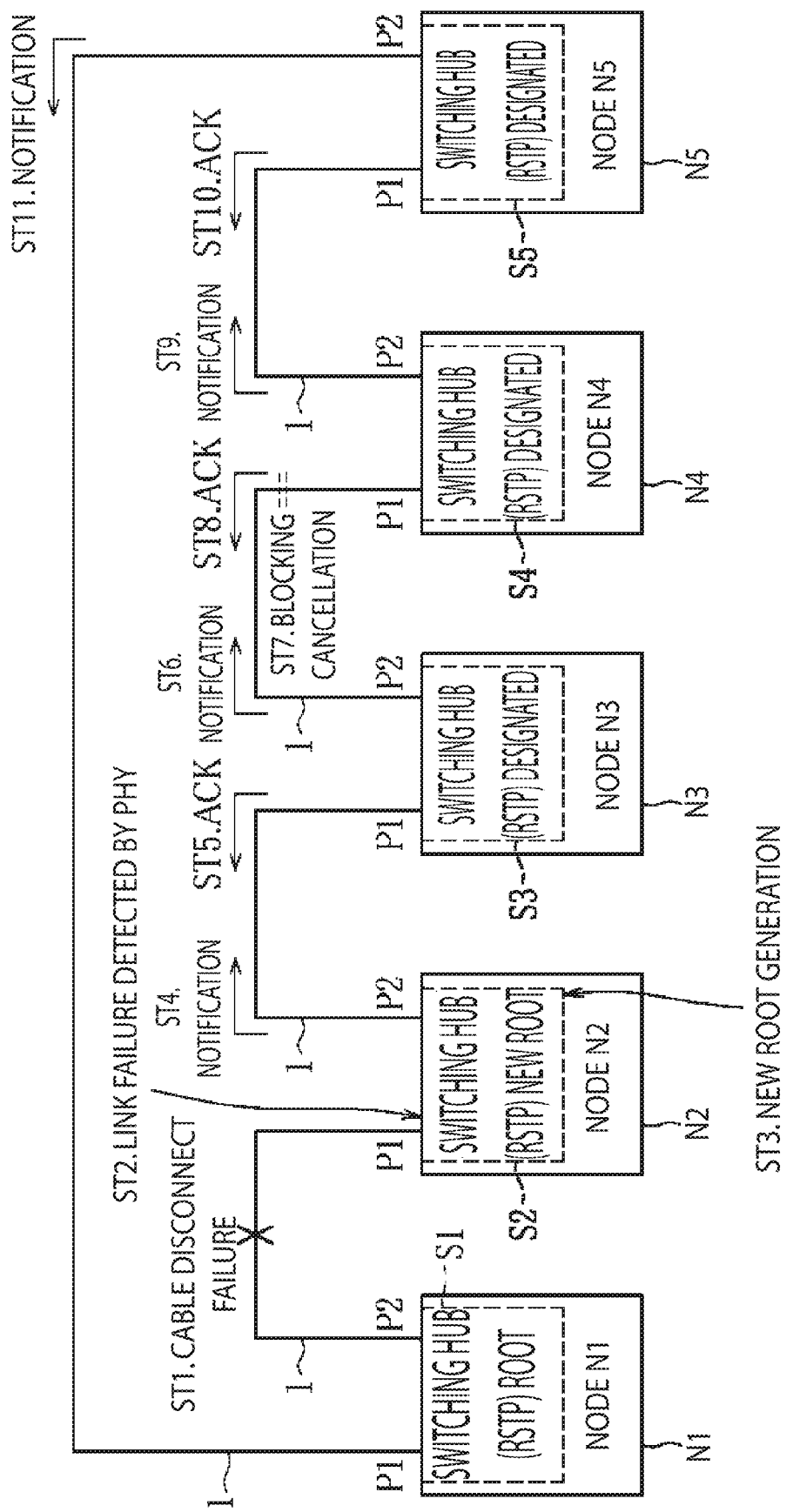
FIG. 4 shows the transfer protocol for notifications and ACKs when a cable disconnection failure occurs in the network shown in FIG. 3.

With blocking thus performed, if a cable disconnection failure occurs in the transmission line 1 between the node N1 and the node N2 as shown in FIG. 4 (ST1), then the node N2 detects the failure via a link signal of the PHY unit 3A of the port P1 (ST2). Thereupon, the node N2 operates as the new root (ST3: generation of new root). To notify the other nodes (i.e., the designated) that the node N2 is starting to operate as a new root, the node N2 transmits a "notification BPDU" (hereinbelow, referred to as a "notification") from its port P2. At this time, the port control modules 21A, 21B of the node N2 reliably transfer the BPDU by exchanging transmit REQs and transmit ACKs with each other.

The node N3, which receives this "notification," replies with an "ACK BPDU" (hereinbelow, called an "ACK") from its port P1 in order to notify the node N2 that it has received the "notification" (ST5). The node N3 transmits a "notification" from its port P2 to the node N4 (ST6). Subsequently, the nodes N4, N5 likewise transmit a "notification" and an "ACK" between them (ST8-ST10). At this time, if the node N4 receives a "notification" from the node N3, the node N4 recognizes that a failure has occurred in the network and cancels blocking (ST7).

Figure 5:
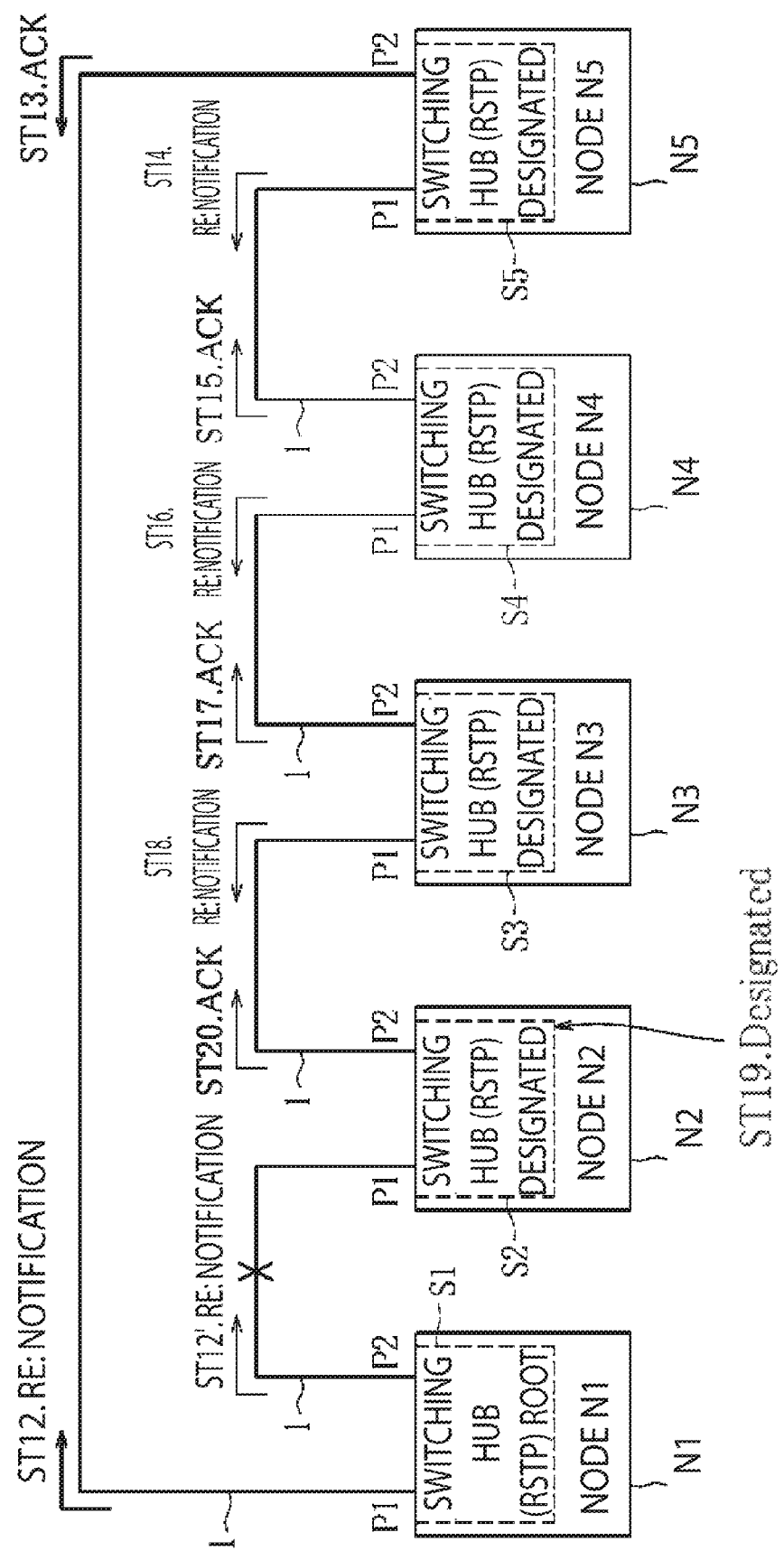
FIG. 5 shows the transfer protocol for replies to the notifications in FIG. 4 and ACKs thereof.

Furthermore, the "notification" from the port P2 of the node N5 arrives at the port P1 of the node N1 (ST11). Thereupon, because the priority level of the node N1 is higher than that of the node N2, the node N1 serves as the root and continues, once again, to perform that function. Next, as shown in FIG. 5, the node N1 notifies the node N2 that it is operating as the root (ST12'); furthermore, a "Re: Notification BPDU" (hereinbelow, "Re: Notification") is sequentially transferred to all of the other nodes N5-N2 to notify them that the "topology has changed" (ST12). The nodes that receive the "Re: Notification" respond thereto by replying with an "ACK/Re: Notification" (ST13-ST20).

Thus, the nodes each receive a "Re: Notification" in turn and reply with an "ACK/Re: Notification" in turn, whereupon a "Re: Notification" finally arrives at the node N2. As such, the priority order control module 22 of the node N2 gives up its operation as a new root and returns to operation as a designated (ST19). Thus, the recovery operation is complete and a new communication route is formed.

Furthermore, if any of the nodes N1-N5 receives a "notification," "ACK," or "Re: Notification," then it recognizes that the topology has changed and cancels the contents of a "port MAC address table" held by the local node. This "port MAC address table" holds the information of the MAC addresses of connection destination nodes of ports.

Here, the sum of the operation times consumed by ST1-ST20 shown in FIG. 4 and FIG. 5 constitutes the recovery time. Furthermore, if the failure (in FIG. 4, between the node N1 and the node N2) is cancelled, then the same operation is performed and the state returns to the normal operation state (i.e., the initial state).

Furthermore, a network system that performs such a recovery operation calculates the time required by the recovery in the present invention. The recovery time of the recovery operation is determined by the following elements:

(a) the RSTP processing times of the nodes N1-N5 and the BPDU propagation times;
(b) the location at which a failure occurred;
(c) the number of connected nodes; and
(d) the communication status of each of the nodes N1-N5.

Here, based on the principle of operation of RSTP discussed above, the RSTP processing times of the nodes and the BPDU propagation times can be classified into the following five main elements:

(1) RT1: the time from when a node (in the case of FIG. 4, the node N2) detects the occurrence of a failure until the completion of the transmission of a "notification" to the neighboring node;
(2) RT2: the time required to complete both the reply of an "ACK" by each of the nodes (in the case of FIG. 4, the nodes N3-N5) that received a "notification" and the transmission of a "notification" from the other port;
(3) RT3: the time from when a node (in the case of FIG. 4 and FIG. 5, the node N1) receives a "notification" until the completion of the transmission of a "Re: Notification" to both ports;
(4) RT4: the time required to complete both the reply of an "ACK" by each of the nodes (in the case of FIG. 5, for example, the nodes N3, N4, N5) after receiving a "Re: Notification" and the transmission of a "Re: Notification" from the other port; and
(5) RT5: the time from when the node at which a failure was detected (in the case of FIG. 5, the node N2) receives a "Re: Notification" until the completion of the transmission of an "ACK."

A computational model of the present invention for these five elemental times will now be created and computed.
Computational Model (1) RT1

First, the required time for the propagation time RT1 will be derived. As shown in FIG. 6 and FIG. 7, the time from when a failure occurs until the PHY unit 3A (or 3B) detects the failure (i.e., a link failure) is t1; the time from when the PHY unit 3A (or 3B) detects the link failure until the completion of processing by the RSTP processing unit 20 is t2; the time needed to perform the process of transmitting the "notification" data to the other MAC unit 4B (or 4A) is t3; the time required for the MAC unit 4B (or 4A) to output the "notification" data to the MII (media independent interface) is t4; the time needed by the PHY unit 3B (or 3A) to perform the transfer (i.e., the transfer delay time) is t5; and the propagation time of the transmission line (i.e., the cable) is t6.

Furthermore, the conditions for deriving these times are as follows: the frame length of the "notification" data is 72 bytes; the network uses 100 m lengths of category 5 cables (i.e., transmission lines), which are compliant with TIA/EIA-568-A-5, and is based on the 100 BASE-TX standard stipulated by IEEE 802.3, which transmits at 100 Mbps; and the frequencies of the operating clocks of the PHY units 3A, 3B and the MAC units 4A, 4B are 25 MHz and 50 MHz, respectively.

Thereupon, the times discussed above are defined as follows: t1≦20 µs (actual measured value), t2=0.14 µs (7 clock cycles), t3=0.2 µs (5 clock cycles), t4=5.76 µs (frame length: 72 bytes), t5=70 ns (7 BT, i.e., bit times), and t6=538 ns.

Accordingly, the propagation time RT1 is derived by:

$$RT1 = t1 + t2 + t3 + t4 + t5 + t6 =$$
$$20 + 0.14 + 0.2 + 5.76 + 0.07 + 0.538 = 26.708 \text{ µs}.$$

The details of each time are shown in FIG. 7.

Computational Model (2) RT2

Figure 8:
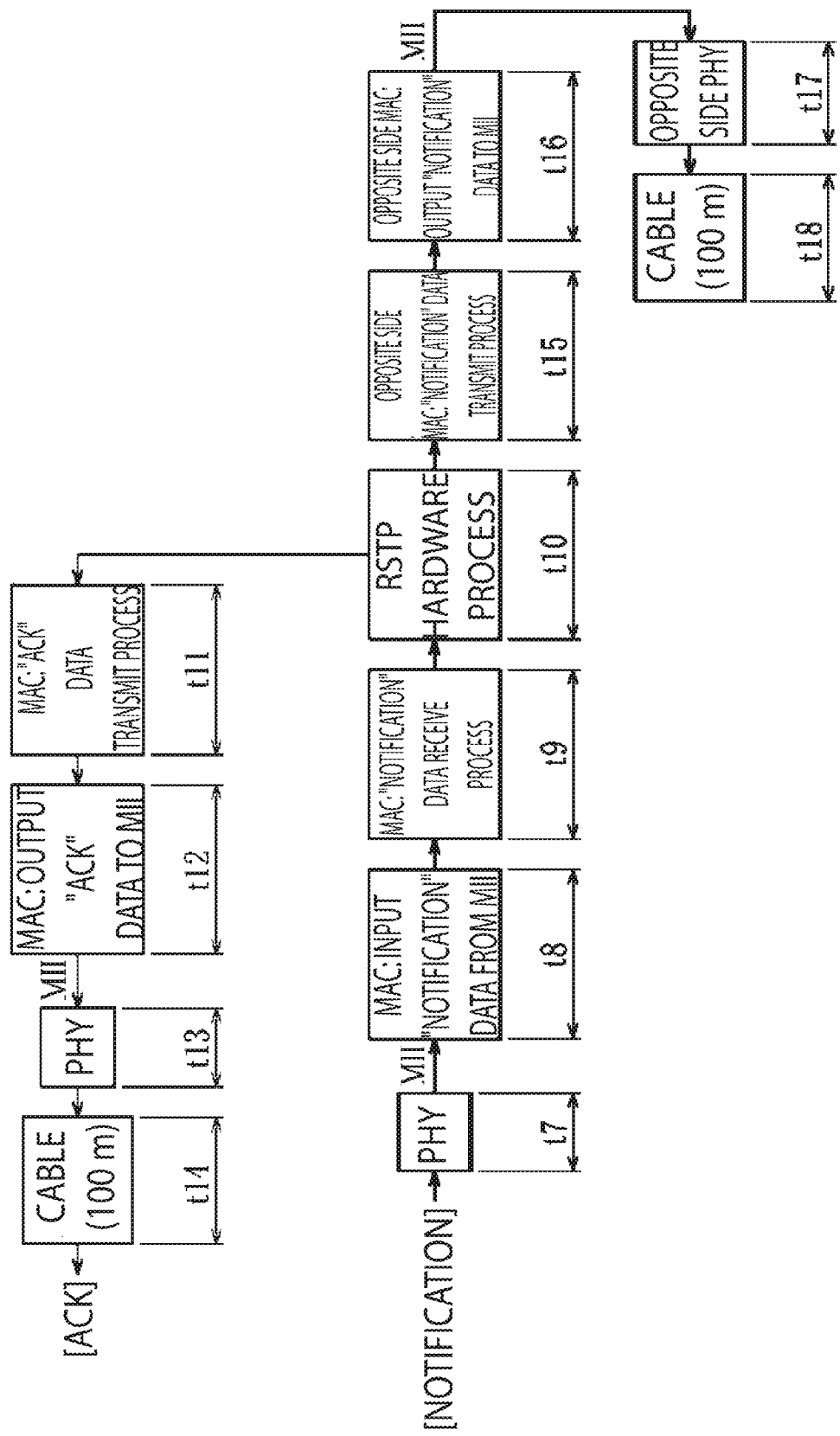
FIG. 8 shows the times from when a node that has received a notification until a reply of an ACK and a transmission of a notification from another port are complete.

Next, the required time for the propagation time RT2 will be derived. As shown in FIG. 8 and FIG. 9, the times needed to perform transfers by the PHY units 3A (or 3B) (i.e., transfer delay times) are t7, t13, t17; the time during which the MAC unit 4A (or 4B) receives a "notification" (i.e., the time during which data is input from the MII) is t8; the time during which the reception of "notification" data by the MAC unit 4A (or 4B) is processed is t9; the time during which hardware processing is performed in the RSTP processing unit 20 is t10; the time during which the MAC unit 4A (or 4B) processes the "ACK" data is t11; the time during which the MAC unit 4A (or 4B) outputs "ACK" data to the MII is t12; the propagation times of the transmission lines (i.e., the cables) are t14, t18; the time during which the other MAC unit 4B (or 4A) processes the transmission of "notification" data is t15; and the time during which the MAC unit 4B (or 4A) outputs "notification" data to the MII is t16.

Furthermore, the conditions for deriving the propagation time RT2 are the same as those for deriving the propagation time RT1 discussed above, with the additional condition that the frame length of an "ACK" is 72 bytes.

Thereupon, the times are defined as follows: t7=t13=t17=70 ns (7 BT), t8=5.76 µs, t9=0.28 µs (7 clock cycles), t10=0.52 µs (26 clock cycles), t11=0.2 µs (5 clock cycles), t12=5.76 µs, t14=t18=538 ns, t15=0.2 µs (5 clock cycles), and t16=5.76 µs.

Incidentally, the time t8 (to input data from MII) during which the MAC unit 4A (or 4B) receives a "notification" is the BPDU send/receive time, which is the same as the time t4 in the equation discussed above wherein the propagation time RT1 is derived, and this time is therefore not included in the propagation time RT2. This is because the processes of transmitting and receiving "notification" data in t4 and t8 are executed simultaneously in each of the nodes. In addition, the abovementioned times [t11+t12+t13+t14] and [t15+t16+t17+t18] are executed simultaneously by hardware parallel processing in the two MAC units. Accordingly, the propagation time RT2 should be derived using either one of those times. Both are equivalent from the standpoint of their computed values; however, taking note of the connection with the processing time in the next node, the latter is used herein.

Accordingly, the propagation time RT2 is derived as follows:

$$RT2 = t7 + t9 + t10 + t15 + t16 + t17 + t18 =$$
$$0.07 + 0.28 + 0.52 + 0.2 + 5.76 + 0.07 + 0.538 = 7.438 \text{ µs}.$$

The details of each time are listed in FIG. 9.

Computational Model (3) RT3

Figure 10:
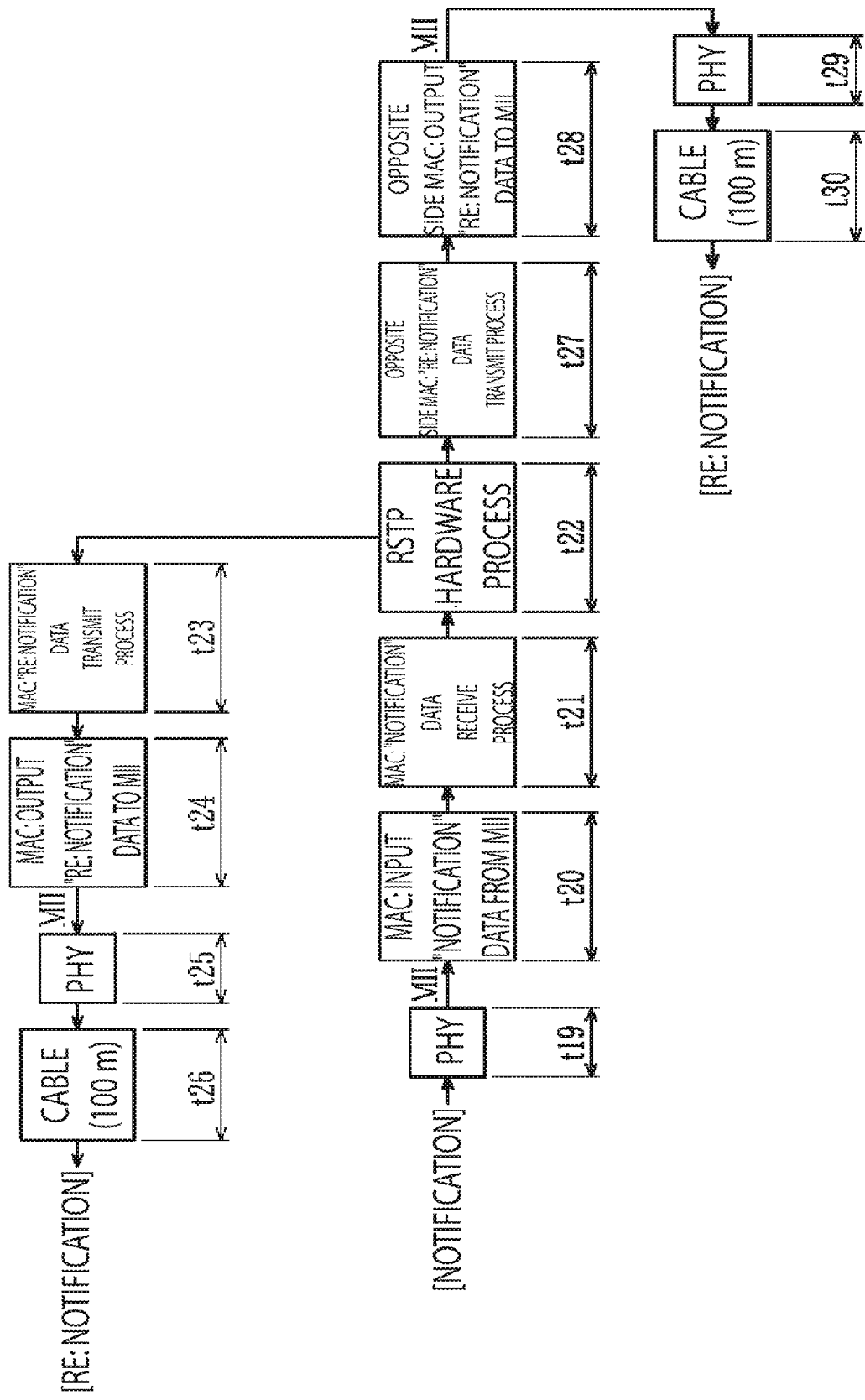
FIG. 10 shows the times from when a notification is received until the transmission of replies thereto via both ports is complete.

Next, the required time for the propagation time RT3 will be derived. As shown in FIG. 10 and FIG. 11, the times needed to perform transfers by the PHY units 3A (or 3B) (i.e., transfer delay times) are t19, t25, t29; the time during which the MAC unit 4A (or 4B) inputs a "notification" from the MII is t20; the time during which the reception of "notification" data by the MAC unit 4A (or 4B) is processed is t21; the time during which hardware processing is performed in the RSTP processing unit 20 is t22; the time during which the MAC unit 4A (or 4B) processes the transmission of "Re: notification" data is t23; the time during which the MAC unit 4A (or 4B) outputs "Re: notification" data to the MII is t24; the propagation times of the transmission lines (i.e., the cables) are t26, t30; the time during which the other MAC unit 4B (or 4A) processes the transmission of "Re: notification" data is t27; and the time during which the MAC unit 4B (or 4A) outputs "Re: notification" data to the MII is t28.

Furthermore, the conditions for deriving the propagation time RT3 are the same as those for deriving the propagation times RT1, RT2 discussed above, with the additional condition that the frame length of a "Re: notification" is 72 bytes.

Incidentally, as in the computation of the propagation time RT2, the time t20 during which the MAC unit 4A (or 4B) inputs a "notification" from the MII occurs simultaneously with the time t16 in the equation of the propagation time RT2 discussed above, and therefore this time is not included in the computation of the propagation time RT3. In addition, the abovementioned times [t23+t24+t25+t26] and [t27+t28+t29+t30] occur during hardware parallel processing and are therefore executed simultaneously. Accordingly, it is sufficient to compute the propagation time RT3 using either one of those times. Taking note of the connection with the processing time in the next node, the former is used herein.

Accordingly, the propagation time RT3 is derived as follows:

$$RT3 = t19 + t21 + t22 + t23 + t24 + t25 + t26 =$$
$$0.07 + 0.28 + 0.32 + 0.2 + 5.76 + 0.07 + 0.538 = 7.238 \text{ µs}.$$

The details of each time are listed in FIG. 11.

Computational Model (4) RT4

Figure 12:
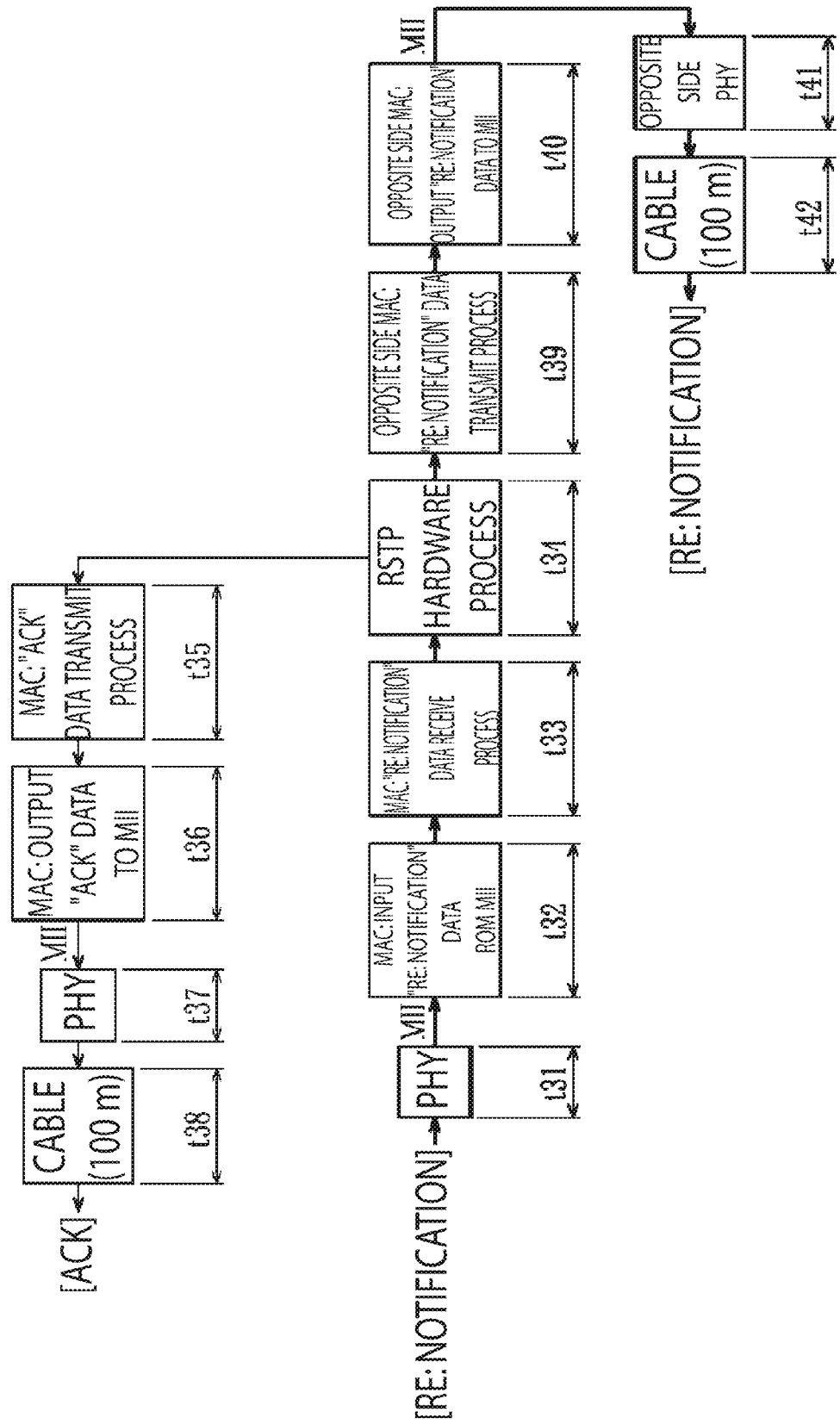
FIG. 12 shows the times from when a reply to a notification is received until a reply of an ACK and a transmission of a response to the notification via another port are complete.

Next, the required time for the propagation time RT4 will be derived. As shown in FIG. 12 and FIG. 13, the times needed to perform transfers by the PHY units 3A (or 3B) (i.e., transfer delay times) are t31, t37, t41; the time during which the MAC unit 4A (or 4B) inputs a "Re: notification" from the MII is t32; the time during which the reception of "Re: notification" data by the MAC unit 4A (or 4B) is processed is t33; the time during which hardware processing is performed in the RSTP processing unit 20 is t34; the time during which the MAC unit 4A (or 4B) processes the transmission of "ACK" data is t35; the time during which the MAC unit 4A (or 4B) outputs "ACK" data to the MII is t36; the propagation times of the transmission lines (i.e., the cables) are t38, t42; the time during which the other MAC unit 4B (or 4A) processes the transmission of "Re: notification" data is t39; and the time during which the MAC unit 4B (or 4A) outputs "Re: notification" data to the MII is t40.

Furthermore, the conditions for deriving the propagation time RT4 are the same as those for deriving the propagation times RT1-RT3 discussed above.

Incidentally, as in the computation of the propagation times RT2, RT3, the time t32 during which the MAC unit 4A (or 4B)

inputs a "Re: notification" from the MII occurs simultaneously with the time t28 in the equation of the propagation time RT3 discussed above, and therefore this time is not included in the computation of the propagation time RT4. In addition, the abovementioned times [t35+t36+t37+t38] and [t39+t40+t41+t42] occur during hardware parallel processing and are therefore executed simultaneously. Accordingly, it is sufficient to compute the propagation time RT4 using either one of those times. Taking note of the connection with the processing time in the next node, the latter is used herein.

Accordingly, the propagation time RT4 is derived as follows:

$$RT4 = t31 + t33 + t34 + t39 + t40 + t41 + t42 =$$
$$0.07 + 0.28 + 0.4 + 0.2 + 5.76 + 0.07 + 0.538 = 7.318 \text{ μs.}$$

The details of each time are listed in FIG. 13.

Computational Model (5) RT5

Lastly, the required time for the propagation time RT5 will be derived. As shown in FIG. 14 and FIG. 15, the times needed to perform transfers by the PHY units 3A (or 3B) (i.e., transfer delay times) are t43, t49; the time during which the MAC unit 4A (or 4B) inputs a "Re: notification" from the MII is t44; the time during which the reception of "Re: notification" data by the MAC unit 4A (or 4B) is processed is t45; the time during which hardware processing is performed in the RSTP processing unit 20 is t46; the time during which the MAC unit 4A (or 4B) processes the transmission of "ACK" data is t47; the time during which the MAC unit 4A (or 4B) outputs "ACK" data to the MII is t48; and the propagation time of the transmission line (i.e., the cable) is t50.

Furthermore, the conditions for deriving the propagation time RT5 are the same as those for deriving the propagation times RT1-RT4 discussed above.

Incidentally, as in the computation of the propagation times RT2-RT4, the time t44 during which the MAC unit 4A (or 4B) inputs a "Re: notification" from the MII occurs simultaneously with the time t40 in the equation of the propagation time RT4 discussed above, and therefore this time is not included in the computation of the propagation time RT5.

Accordingly, the propagation time RT5 is derived as follows:

$$RT5 = t43 + t45 + t46 + t47 + t48 + t49 + t50 =$$
$$0.07 + 0.28 + 0.52 + 0.2 + 5.76 + 0.07 + 0.538 = 7.438 \text{ μs.}$$

The details of each time are listed in FIG. 15.

Integrated Computational Model

The recovery time RT (i.e., at its maximum value) in the network comprising the five nodes N1-N5 shown in FIG. 3 is derived based on these propagation times RT1-RT5, as shown by the equation below.

$$RT = RT1(\text{node } N2) + RT2(\text{node } N3) + RT2(\text{node } N4) + RT2(\text{node } N5) +$$
$$RT3(\text{node } N1) + RT4(\text{node } N5) + RT4(\text{node } N4) + RT4(\text{node } N3) +$$
$$RT5(\text{node } N2) = RT1 + 3 \times RT2 + RT3 + 3 \times RT4 + RT5 =$$
$$26.708 + 3 \times 7.438 + 7.238 + 3 \times 7.318 + 7.438 = 85.652 \text{ μs}$$

Therein, the recovery time derived by this equation corresponds to the state wherein data not related to RSTP processing performed by each of the nodes is not being transmitted (hereinbelow, called the zero load).

In addition, based on this equation, if the network is configured as a ring topology with n nodes, then the equation for deriving the recovery time RT (i.e., at its maximum value) can be obtained by the equation below.

$$RT = RT1 + (n-2) \times RT2 + RT3 + (n-2) \times RT4 + RT5 =$$
$$26.71 + (n-2) \times 7.438 + 7.238 + (n-2) \times 7.318 + 7.438 =$$
$$26.628 + (n-1) \times 14.756 \text{ μs}$$

Accordingly, the recovery time RT (i.e., at its maximum value) in the case of a configuration that comprises 100 nodes is approximately 1.487 ms.

Conversely, if restricting recovery time to within 10 ms in a network that needs to handle real-time transmission, such as in a factory system or a building system, is desired, then the maximum number of nodes should be derived by modifying the above equation, and that number is 676.

Next, the propagation times RT1-RT5 (hereinbelow, called absolute maximum loads) will be similarly derived, assuming that frames of 1,526 bytes, which is the maximum length of a frame that can be output in one shot to the network by each node as stipulated by IEEE 802.3, are output. In the 100 BASE-TX standard, the time required to output a frame of 1,526 bytes is 122.08 μs, and this time should be added to each of the abovementioned RT1-RT5. Specifically, 122.08 μs should be added to each of the times t4, t16, t28, t40, t48, during which data is output to the MII as discussed above.

Thus, the propagation times RT1-RT5, derived as the time required by each node to arbitrarily transmit data of 1,526 bytes, are as below.

$RT1 = 148.788$ μs $RT2 = 129.518$ μs $RT3 = 129.318$ μs $RT4 = 129.398$ μs $RT5 = 129.518$ μs

Accordingly, the recovery time RT (i.e., at the maximum value) when the five nodes are at the absolute maximum load is as below when the above equations are used.

$RT = 1,184.372$ μs

In addition, the recovery time RT (i.e., at the maximum value) for the case of n nodes is as below.

$RT = 148.708 + (n-1) \times 258.916$ μs

Accordingly, to keep the recovery time in this case to within 10 ms, the number of nodes should be fewer than 39.

Next, in a network that needs to handle real-time transmission, such as in a factory system or a building system, each of the nodes typically sends and receives data of approximately 200 bytes (this is called the real maximum load). Accordingly, we now recompute the propagation times RT1-RT5 as the time required by each of the nodes to arbitrarily transmit data of 200 bytes. In the case of the 100 BASE-TX standard, the time needed to transmit data of 200 bytes is 16 μs, and therefore 16 μs should be added to the times t4, t16, t28, t40, t48, during which data is output to the MII as discussed above.

Thus, the derived propagation times RT1-RT5 are as below.

$RT1 = 42.708 \,\mu s$ $RT2 = 23.438 \,\mu s$ $RT3 = 23.238 \,\mu s$ $RT4 = 23.318 \,\mu s$ $RT5 = 23.438 \,\mu s$

Accordingly, when the above equations are used, the recovery time RT (i.e., at the maximum value) when the five nodes are at the real maximum load is as below.

$RT = 229.652 \,\mu s$

In addition, the recovery time RT (i.e., at the maximum value) for the case of n nodes is as below.

$RT = 42.628 + (n-1) \times 46.756 \,\mu s$

Accordingly, in this case, the maximum number of nodes that satisfies the condition that the recovery time be within 10 ms is 213.

FIG. 16 shows a graph of the relationship between the number of nodes and the recovery time thus derived. This graph confirms that the RSTP processing system of the present invention can also be sufficiently adapted to a real-time system.

Thus, in the RSTP processing system of the present invention, the RSTP processing unit 20, which processes the RSTP, is incorporated as hardware in the data link layer, the RSTP processing unit 20 and the BPDU send/receiver buffers 10A, 10B of the MAC units 4A, 4B are respectively connected by the BPDU data buses 13A, 13B, and the RSTP process is executed in the hardware; therefore, BPDUs can be processed at extremely high speeds without the intervention of software processing.

In addition, in the RSTP processing system of the present invention, the RSTP processing unit 20 is notified via the link signal of failures in the physical layer level detected by the PHY unit 3A (or 3B), and the RSTP processing unit 20 that receives the failure notification via the link signal transmits BPDU data to the network from the BPDU send/receive buffer 10B (or 10A) of the other MAC unit 4B (or 4A) connected to the other PHY unit 3B (or 3A); therefore, BPDU data can be transferred with extremely small transmission delay times.

Furthermore, in the RSTP processing system of the present invention, the RSTP processing unit 20 is provided with the priority order control module 22, which determines the priority level of the local node; therefore, the order of priorities of nodes can be rapidly switched (i.e., the root and the designated can be switched) during a recovery, and thereby the network can recover after a short time.

In addition, the RSTP processing system of the present invention is configured such that the MAC units 4A, 4B are respectively provided with the switch units 11A, 11B, and the paths to the CPU and the BPDU send/receiver buffers 10A, 10B can be switched; furthermore, when the receive data delivered from the PHY units 3A, 3B to the MAC units 4A, 4B respectively is BPDU data, the RSTP processing unit 20 issues instructions to switch the switch units 11A, 11B to the BPDU send/receiver buffers 10A, 10B; moreover, if the receive data is not BPDU data, then the RSTP processing unit 20 issues instructions to the BPDU send/receive processing modules 12A, 12B to switch the switch units 11A, 11B to the upper layer data buses. Therefore, an enormously practical effect, wherein, for example, it is possible to recover and reconfigure a network within a short time after a failure while maintaining communication in the upper layers between nodes, is achieved.

Furthermore, the RSTP processing system of the present invention is not limited to the abovementioned embodiments, and it is understood that variations and modifications may be effected without departing from the spirit and scope of the invention.

What is claimed is:

1. An RSTP processing system in a network that has a ring topology wherein multiple IEEE 802.3 compliant nodes are connected via prescribed transmission lines, wherein each of the nodes comprises:

two physical layer (PHY) units, each of which is connected to one of the transmission lines and executes processing according to the physical layer of an open system interconnection (OSI) reference model;

two media access control (MAC) units, each of which is connected to one of the PHY units and executes processing according to a lower sublayer of the data link layer of the OSI reference model;

an RSTP processing unit, which is connected to the MAC units and processes a rapid spanning tree protocol;

Bridge protocol data unit (BPDU) send/receive buffers, each of which is provided to one of the MAC units and sends and receives BPDU data in the rapid spanning tree protocol; and two BPDU data buses, which transfer the BPDU data between the BPDU send/receive buffers and the RSTP processing unit; and wherein the RSTP processing unit:

receives BPDU data, which is received from the network by one of the PHY units and stored in the BPDU send/receive buffer of the MAC unit that is connected to that PHY unit, via the BPDU data bus that is connected to that MAC unit;

decodes the received BPDU data;

performs a prescribed process;

transfers prescribed BPDU data, via the BPDU data bus that is connected to the other MAC unit, to the other BPDU send/receive buffer; and transmits that BPDU data from the PHY unit connected to the other MAC unit to the network, and wherein the PHY unit has a link signal line that is used to notify the RSTP processing unit of a failure in the physical layer level; and wherein the RSTP processing unit, when it is notified via the link signal line of one of the PHY units of a failure in the physical layer level, transmits to the network via the other PHY unit notification BPDU data from the BPDU send/receive buffer that has the MAC unit connected to the other PHY unit.

2. The RSTP processing system according to claim 1, wherein the RSTP processing unit comprises:

two port control modules, which control the BPDU send/receive buffers of the two MAC units; and a priority order control module, which determines the priority level of the local node in the network; and the BPDU send/receive operations of the two MAC units are performed as a parallel process.

3. The RSTP processing system according to claim 2, wherein each of the MAC units comprises:

an upper layer data bus, which transfers send/receive data to and from a CPU, which controls a protocol of an upper layer of the OSI reference model;

a switch unit, which switches the connection of the PHY unit to either the upper layer data bus or the BPDU send/receive buffer; and a BPDU send/receive processing module, that, under the control of the RSTP processing unit, switches the connection destination of the switch unit; and when either the receive data transferred from one of the PHY units to the corresponding MAC unit or the transmit data transferred from one of the MAC units to the corresponding PHY unit is the BPDU data, the corresponding port control module issues an instruction to the corresponding BPDU send/receive processing module to switch the corresponding switch unit to the corresponding BPDU send/receive buffer side; and when the receive data or the transmit data is not the BPDU data, the corresponding port control module issues an instruction to switch the corresponding switch unit to the corresponding upper layer data bus side.

* * * * *